United States Patent
Magi et al.

(10) Patent No.: US 9,921,618 B2
(45) Date of Patent: Mar. 20, 2018

(54) COOLING SOLUTION FOR A DOCK

(71) Applicant: INTEL CORPORATION, Santa Clara, CA (US)

(72) Inventors: Aleksander Magi, Aloha, OR (US); Mark J. Gallina, Hillsboro, OR (US); Catharina Biber, Portland, OR (US); Xi Guo, Hillsboro, OR (US); Gabriele C. Garbarino, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 14/998,063

(22) Filed: Dec. 24, 2015

(65) Prior Publication Data

US 2017/0185112 A1 Jun. 29, 2017

(51) Int. Cl.
*G06F 1/20* (2006.01)
*G06F 1/16* (2006.01)

(52) U.S. Cl.
CPC .............. *G06F 1/20* (2013.01); *G06F 1/1632* (2013.01)

(58) Field of Classification Search
CPC ................................ G06F 1/20; G06F 1/1632
See application file for complete search history.

(56) References Cited

U.S. PATENT DOCUMENTS

| | | | | |
|---|---|---|---|---|
| 5,704,212 A * | 1/1998 | Erler | ...................... | F25B 21/04 361/679.41 |
| 6,191,943 B1 * | 2/2001 | Tracy | ...................... | G06F 1/203 361/679.46 |
| 7,342,787 B1 * | 3/2008 | Bhatia | ...................... | G06F 1/203 165/104.33 |
| 7,403,384 B2 * | 7/2008 | Pflueger | ............. | H05K 7/20545 165/104.21 |
| 7,843,691 B2 * | 11/2010 | Reichert | .................. | G06F 1/203 165/104.33 |
| 7,974,090 B2 * | 7/2011 | Risher-Kelly | ........ | G06F 1/1632 165/185 |
| 8,926,414 B1 * | 1/2015 | Kirkpatrick | ........ | H05K 7/20136 361/679.41 |
| 2001/0007525 A1 | 7/2001 | Tracy | | |

(Continued)

FOREIGN PATENT DOCUMENTS

| | | |
|---|---|---|
| WO | 0135200 A1 | 5/2001 |
| WO | 2015094280 A1 | 6/2015 |
| WO | 2015105741 A1 | 7/2015 |

OTHER PUBLICATIONS

PCT International Search Report, PCT Application No. PCT/US2016/057897, dated Jan. 26, 2017, 4 pages.

(Continued)

*Primary Examiner* — Xanthia C Cunningham
(74) *Attorney, Agent, or Firm* — International IP Law Group, P.L.L.C.

(57) ABSTRACT

The present techniques are related a dock with a cooling solution. The performance dock includes a thermoelectric device, an alignment mechanism, and an air mover. The alignment mechanism is to align the computing device when docking the computing device, and the thermoelectric device is to cool the computing device when docked, and the air mover is to enable an airflow through the dock to cool the thermoelectric device when the computing device is docked.

24 Claims, 9 Drawing Sheets

(56) References Cited

U.S. PATENT DOCUMENTS

| | | | |
|---|---|---|---|
| 2005/0068723 A1* | 3/2005 | Squillante | G06F 1/20 361/679.46 |
| 2005/0174733 A1* | 8/2005 | Novotny | G06F 1/20 361/695 |
| 2005/0230080 A1* | 10/2005 | Paul | F04B 19/006 165/47 |
| 2007/0079615 A1* | 4/2007 | Lee | G06F 1/20 62/3.2 |
| 2010/0008036 A1 | 1/2010 | Risher-Kelly | |
| 2010/0008473 A1* | 1/2010 | Liu | G01T 7/00 378/189 |
| 2010/0081377 A1 | 4/2010 | Chatterjee et al. | |
| 2010/0134977 A1* | 6/2010 | Chang | G06F 1/203 361/695 |
| 2010/0281884 A1* | 11/2010 | Rawski | F25B 21/04 62/3.6 |
| 2010/0309622 A1* | 12/2010 | Zimmermann | G06F 1/203 361/679.41 |
| 2011/0267769 A1* | 11/2011 | Nakamura | G06F 1/203 361/679.48 |
| 2012/0031453 A1* | 2/2012 | Rao | F25B 21/02 136/242 |
| 2012/0125014 A1* | 5/2012 | Ilercil | F25B 21/02 62/3.3 |
| 2014/0063721 A1* | 3/2014 | Herman | G06F 1/20 361/679.31 |
| 2015/0037836 A1* | 2/2015 | Morris | G01N 1/42 435/40.5 |
| 2016/0003503 A1* | 1/2016 | Novisoff | F25B 21/02 62/3.3 |
| 2016/0262286 A1* | 9/2016 | Lin | H05K 7/20145 |
| 2017/0090531 A1* | 3/2017 | Forbes | G06F 1/1632 |

OTHER PUBLICATIONS

INTEL CORPORATION, PCT App. No. PCT/US2015/62235, International Filing Date Nov. 24, 2015, Application, Drawings, and Filing Receipt dated Nov. 24, 2015 attached (84 pages), not yet published.

Magi, Aleksander, U.S. Appl. No. 29/505,653, filed in the USPTO Dec. 26, 2015, US Application, Drawings, and Filing Receipt dated Jan. 29, 20161 attached (20 pages), not yet published.

* cited by examiner

100

300A

300B

400

600

COOLING SOLUTION FOR A DOCK

FIELD

The present techniques generally relate to the cooling of computing and/or electronic devices. More specifically, the present techniques relate to a dock with cooling via an integrated Peltier material.

BACKGROUND

As computing devices with small form factors continue to become more powerful, they have also become thinner and lighter. These powerful computing devices with small form factors may be physically or wirelessly docked to docking units for convenient access to additional resources, including a network, a printer, mass storage devices such as hard disk drives, compact disks (CD) or digital video disk (DVD) drives, and other types of peripheral devices. By using a docking unit, such peripheral resources become available once the computing device is docked. Docking a computing device can also provide power to the computing device, such that the battery may be recharged and the device would be supplied with power from the mains power supply of a structure, such as a home or office building.

BRIEF DESCRIPTION OF THE DRAWINGS

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
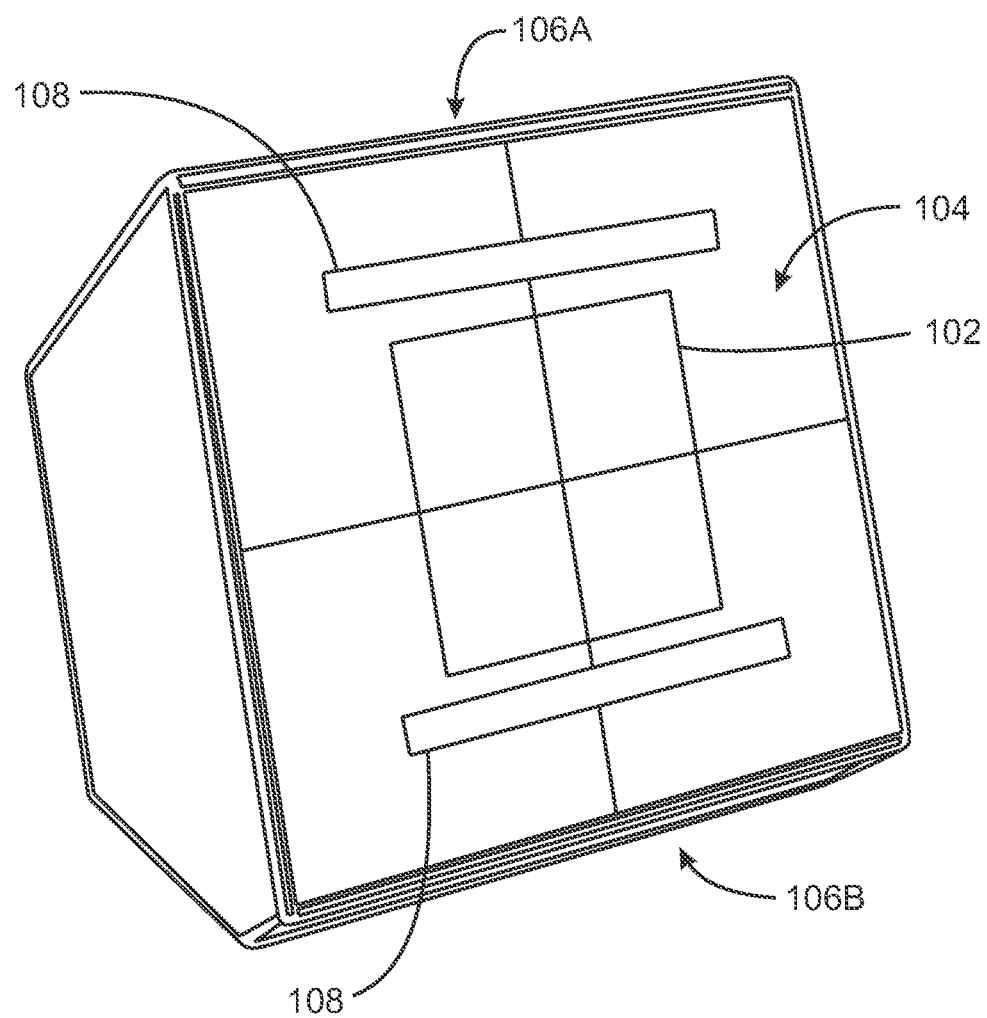
FIG. 1 is a block diagram of dock.

Docks often enable computing devices to access storage and various peripheral devices in order to provide the functionality of a larger, generally stationary desktop computing device. As used herein, a computing device generally refers to devices such as tablets, phablets, notepads, laptops, mobile devices, mobile phones, smart phones, and the like. Computing devices typically include rechargeable batteries that can be charged while coupled with the dock. An electrical outlet may enable access to the mains power supply of a structure, such as a home or office building. In embodiments, the dock includes components to convert alternating current (A/C) power from the electrical outlet to direct current (D/C) power. The D/C power is then routed to the computing device through a wireless connector or through a physical power supply cable.

Embodiments described herein provide a dock with cooling via an integrated thermoelectric material. In embodiments, the dock can perform typical docking features, such as enabling access to various peripheral devices, cooling, and charging. The dock may include an integrated Peltier ceramic plate to cool a docked computing device. In embodiments, the dock also includes alignment mechanisms, such as a magnetic attachment component. Further, the dock may include an air mover to guide air through the dock. Through the present techniques, a closed loop power, temperature, and condensation control of a computing device may be enabled by a cooling dock. This closed loop power, temperature, and condensation control enables the dock to maximize performance of the computing device according to ambient conditions and performance demands of the device.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of dock 100. In embodiments, a computing device, such as a tablet or phablet may be docked with the dock 100. Although the present techniques are described using a phone device, any computing device capable of being docked can be used. Additionally, the dock, as used herein, can refer to any device that is to expand a device's access to peripheral devices, and/or supply power to the computing device.

The dock 100 includes a thermoelectric cooling area 102. In thermoelectric cooling, a heat flux may be created between the junction of two conducting materials. Heat may be transferred from one location to another, across the junction, based on the direction of the current. The dock may include a plurality of junctions, wherein the cooling occurs at each junction based on the flow of current. Each junction is in series with the remaining junctions. In embodiments, the thermoelectric cooling is accomplished using the Peltier effect, and is referred to as using a Peltier plate. The materials selected of the Peltier plate can include any materials with Peltier coefficients that can create a cooling effect.

The thermoelectric device 102 is located along a thermally conductive front material 104. In embodiments, the thermoelectric device 102 is located underneath or behind the thermally conductive front material 104 and is thermally coupled with the thermally conductive front material 104. The thermally conductive front material 104 creates a front plane and a docked computing device may dock parallel to the front plane created by the thermally conductive front material 104. The dock 100 may include an exhaust 106A and an exhaust 106B. The exhaust 106A and the exhaust 106B are to enable the flow of air within the dock 100. In this manner, heated air can be moved away from components of the dock by an air mover, such as a fan. While the exhaust 106A and the exhaust 106B are illustrated at the top and bottom of the dock 100, the exhaust 106A and the exhaust 106B can be located at any point on the dock 100. Moreover, a single exhaust or vent or a plurality of exhausts or vents may be located on the dock 100.

The dock 100 also includes an alignment mechanism 108. In embodiments, the alignment mechanism is located behind the thermally conductive front plane 104. The alignment mechanism may be, for example magnetic strips. The computing device may have corresponding magnetic strips that guide the computing device into position when a user physically couples the computing device with the dock 100. Magnetic strips, when used as an alignment mechanism, enables close physical contact between the device and the dock in order to minimize thermal contact resistance. Any alignment mechanism is to enable close physical contact between the device and the dock, and can be placed according to the particular design of the dock. Thus, the alignment mechanism can be located placed to the side of the front plane, above the front plane, below the front plane, and so on.

The dock may supply electricity to a computing device via a power supply cable. The dock 100 can also include components to convert the A/C power to D/C power for use by the computing device. For example, the dock 100 can include a transformer to convert the voltage from the A/C power supply of a building to a lower voltage, a rectifier to convert it to pulsating waveform, and a filter to smooth the pulsating waveform to D/C. D/C power can be delivered from the dock 100 to a computing device.

The dock may also implement wireless charging. In wireless charging, resonant inductive coupling between circuitry of the dock and the device results in an electrical energy that is transmitted between the dock and the device. Specifically, two magnetically coupled coils are each a part of resonant circuits of the dock and the device are tuned to resonate at the same frequency. A transmitter coil in the dock can transmits a charging radiation across an intervening space to a resonant receiver coil in the device. In this manner, devices can be charged without a physical coupling to an electrical outlet. Additional wireless charging options include, but are not limited to Contact/Open Dots and Pogo Pins.

Accordingly, the present techniques enable both wireless charging and wireless data transfer solutions. Additionally, the computing device may be positioned at multiple angles with multiple modes of viewing without removing the computing device from the cooling surface. For example, the device may be placed on the cooling dock in any of a portrait mode, a landscape mode, and all angles in between.

Figure 2A:
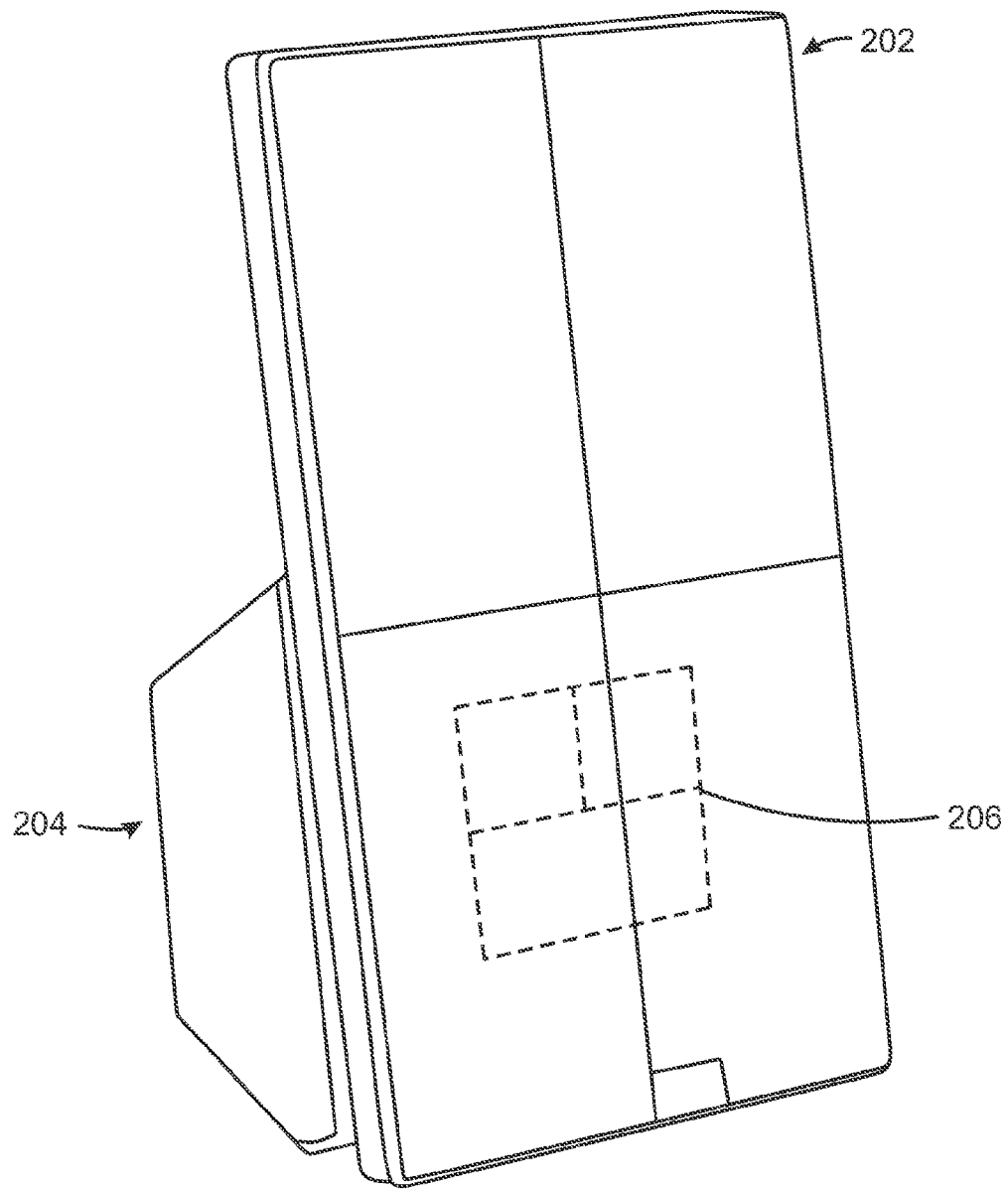
FIG. 2A is a perspective front view of a system including a computing device docked with a dock.

FIG. 2A is a perspective front view of a system 200A including a computing device docked with a dock. As illustrated, a computing device 202 is docked with the dock 204. The system 200 also illustrates a Peltier plate 206 of the dock 204 with dotted lines. The Peltier plate 206 is illustrated for reference purposes and may not be visible from outside of the dock. The computing device 202 is secured in place via an alignment mechanism, such as magnetic strips.

The computing device 202 may include materials and circuitry at the location of the Peltier plate 206 so that the computing device can cool efficiently via the Peltier plate 206. Additionally, the computing device 202 may include corresponding alignment mechanisms so that the computing device may properly align with the dock 204.

By properly aligning the computing device 202 and the dock 204, a region of the dock is in physical contact with a region on the surface of the device. Through this contact, a junction between two conducting materials is created, and heat is transferred from one location to another, across the junction, based on the direction of the current. In this manner, heat may be transferred from the device to the dock, thereby cooling the device. Note that the device includes the appropriate circuitry to enable cooling when in contact with the thermoelectric cooling region of the dock.

Figure 2B:
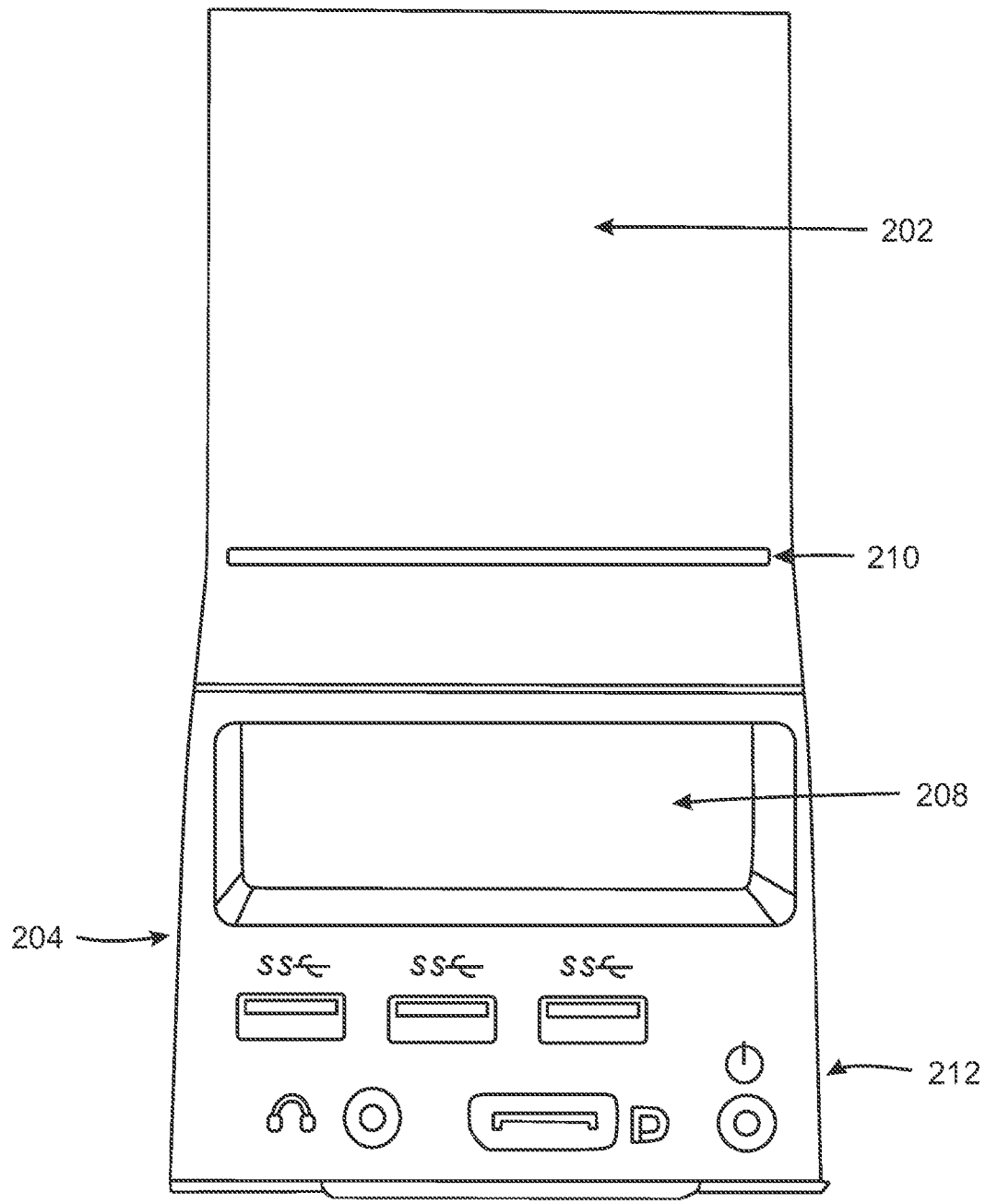
FIG. 2B is a rear view of a system including a computing device docked with a dock.

FIG. 2B is a rear view of a system 200A including a computing device docked with a dock. As illustrated, a computing device 202 is docked with the dock 204. An air intake 208 may enable components of the dock 204 to move air from outside of the dock, through the interior of the docket, and out an exhaust 210. In this manner, an air mover within the dock 204 can cool the thermoelectric device as it generates heat.

The dock may also include a plurality of ports 212. The ports 212 may be used to communicatively couple peripheral devices with the computing device 202. In embodiments, a port 212 is a Universal Serial Bus (USB) Type-C plug or connector. The USB Type-C plug and connector are defined according to the USB Type-C Specification 1.0, released Aug. 11, 2014. The USB Type-C connector is a USB connector that is smaller than previous USB connectors and that enables a connection with a USB receptacle at any orientation. In some cases, the USB Type-C connector is a primary charging connector of a USB device. In embodiments, the dock enables support of the USB Power Delivery Specification, Revision 2.0, released Aug. 11, 2014. Additionally, the dock may enable support of charging according to the USB Battery Charging Specification 1.2, released Dec. 7, 2010. Although a USB Type-C connector is described herein, any type of I/O connector can be used. Thus, the present techniques also enable wired charging and data communications via a cable and according to Universal Serial Bus (USB) standards. Additionally, wireless data communication, may be accomplished via techniques including, but not limited to Pogo Pin and lens data transfer (Lambda).

In embodiments, the dock may be a "smart" dock and can transmit and receive additional power information to the computing device. The additional power information may be a power profile, a charging profile, temperatures, and the like. The additional power information may be obtained by the dock via a sensor, sensor hub, microcontroller, and the like. In embodiments, physical connector may enable power and communication between the computing device and the dock while the computing device is docked. Alternatively, the dock may provide power wirelessly to the computing device via inductive charging or similar technology while docked, and communication via Bluetooth or similar wireless communication technologies. Bluetooth communication may refer to communication according to any Bluetooth specification, such as Bluetooth version 4.2, released Dec. 2, 2014.

Figure 3A:
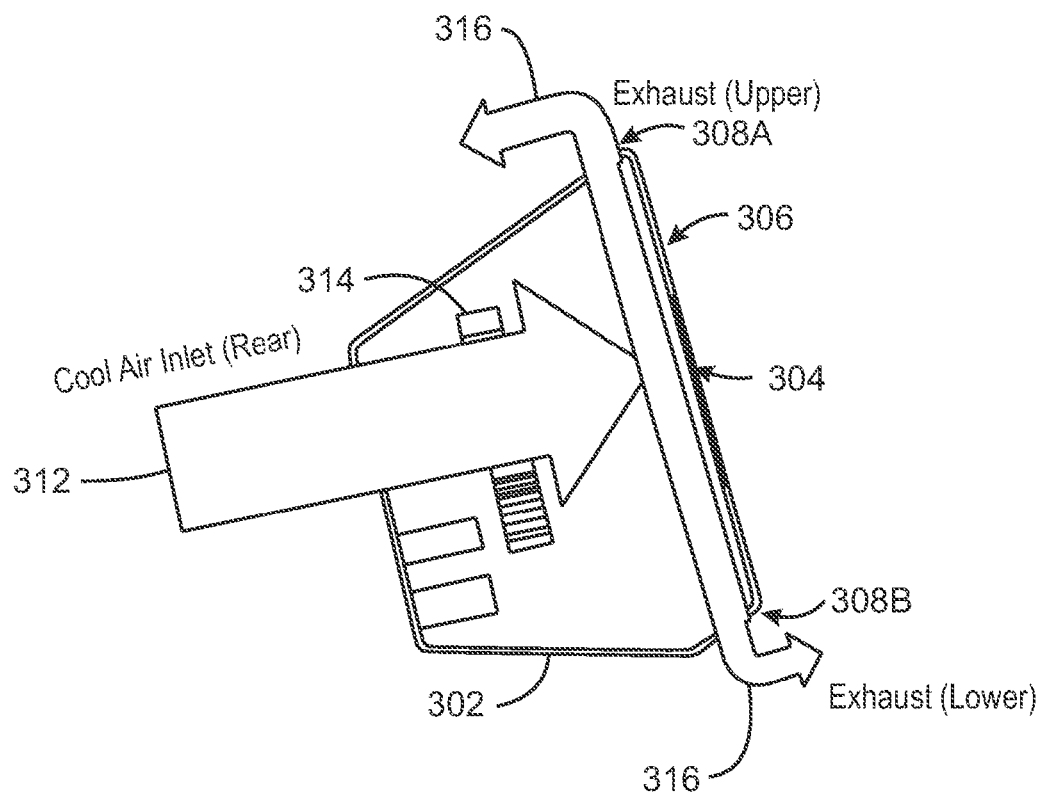
FIG. 3A is an illustration of a system including a cool air inlet and upper and lower exhaust vents.

FIG. 3A is an illustration of a system 300A including a cool air inlet and upper and lower exhaust vents. The dock 302 includes a Peltier plate 304 along a front face 306 of the dock 302. The positioning of the Peltier plate 304 is along the front face of the dock 302 is for ease of description only. The Peltier plate 304 may be placed at any position that enables physical contact with a docked device. The dock 302 also includes an upper exhaust vent 308A and a lower exhaust vent 308B. An intake air vent 310 may guide cool air from outside of the dock 302 to within the dock 302 as illustrated by the arrow 312. In embodiments, an air mover 314 is used to move air through the dock 302. Heated air from within the dock 302 may be expelled through the upper exhaust vent 308A and the lower exhaust vent 308B as illustrated by the arrow 316.

In embodiments, the dock 302 may include one or more air movers 314 to create a flow of air to cool components of the dock 302. In embodiments, the air mover is a fan or blower. Additionally, in embodiments, the air mover is an electrokinetic system. The air mover may cause an airflow from the exterior of the dock 302, through the dock 302 as illustrated by arrow 312, and out of the dock 302 as illustrated by the arrow 316. In embodiments, the heat air flows through both the upper exhaust vent 308A and the lower exhaust vent 308B. As use of the a docked computing device becomes computationally complex and requires use of several processing components of the computing device, heating of the computing device may also increase as a direct result of additional processing. For example, when the computing device is used in high performance applications, the processing done by the computing device may cause additional heat to be generated. Through the present techniques, cooling of the computing device is enhanced via thermoelectric cooling, thereby enabling high performance of the computing device since additional heat is removed by the airflow from the dock combined with the thermoelectric device. Although the thermoelectric device can enhance cooling, the dock is capable of enabling performance enhancements of a computing device even when the thermoelectric device is not powered, and not in use. In particular, the dock may provide further cooling via the air mover and heat sink as described below. The airflow through the dock may be a multi-speed airflow, such that when the thermoelectric device generates a large amount of heat, the airflow is higher in order to provide more cooling for the thermoelectric device. The multi-speed airflow may provide a lower speed of airflow when the thermoelectric device generate a lesser amount of heat.

For example, a computing device may be coupled with the dock and used for typical, everyday activities such as word processing, web browsing, and the like. Typical activities include those activities that are not computationally intensive, do not require a large amount of processing time, and thus do not generate large amounts of thermal energy. In response to the typical activities, the multi-speed airflow may be low. Additionally, the computing device may be coupled with the dock and used for other activities such as gaming, video conferencing, and the like. Other activities, as used herein, include those activities which are computationally intensive and can require a large amount of processing time, a large amount of processing cores, or other processing that generates a large amount of thermal energy. In response to the other activities, the multi-speed airflow may be high.

Accordingly, the speed of the airflow may change from low to and high to low as the heat generated by the computing device changes and requires differing amounts of cooling. As illustrated by the previous example, the heat generated by the computing device may change according to the use of the computing device and the corresponding use of the processing unit(s). The thermoelectric device of the dock may be in physical contact with the computing device in order to cool the computing device, while an air mover is able to provide a multi-speed airflow to cool the thermoelectric device as needed. In embodiments, the speed of the multi-speed airflow is based on the thermal energy generated by the thermoelectric device as it cools the computing device. In this manner, airflow through the dock and ultimately the cooling of a docked computing device may be scaled according to the use of the docked computing device.

Additionally, in embodiments, the speed of the multi-speed airflow is based on a temperature measurement received from the computing device. For example, the temperature measurement may be a temperature of a processing unit of the computing device or the temperature may be a temperature measurement at or near the portion of the computing device that is in physical contact with the thermoelectric device. Moreover, the speed of the multi-speed airflow may be based on a temperature measurement within the dock. The air speed may also be adjusted to control any condensation detected within the computing device or the dock.

In embodiments, a second air mover may also be configured to cool the computing device components as necessary. In some embodiments, the dock and a docked computing device are cooled by an airflow produced by the same air mover in additional to thermoelectric cooling as described above. In embodiments, a docked computing device is cooled according to a use profile, such that the airflow and thermoelectric cooling are a function of use profile for the computing device. Additionally, in embodiments, the airflow may be a multi-speed airflow. Moreover, condensation within the computing device may be controlled by increase the cooling of the computing device, thereby controlling the temperature of the device and ultimately condensation within the device.

Figure 3B:
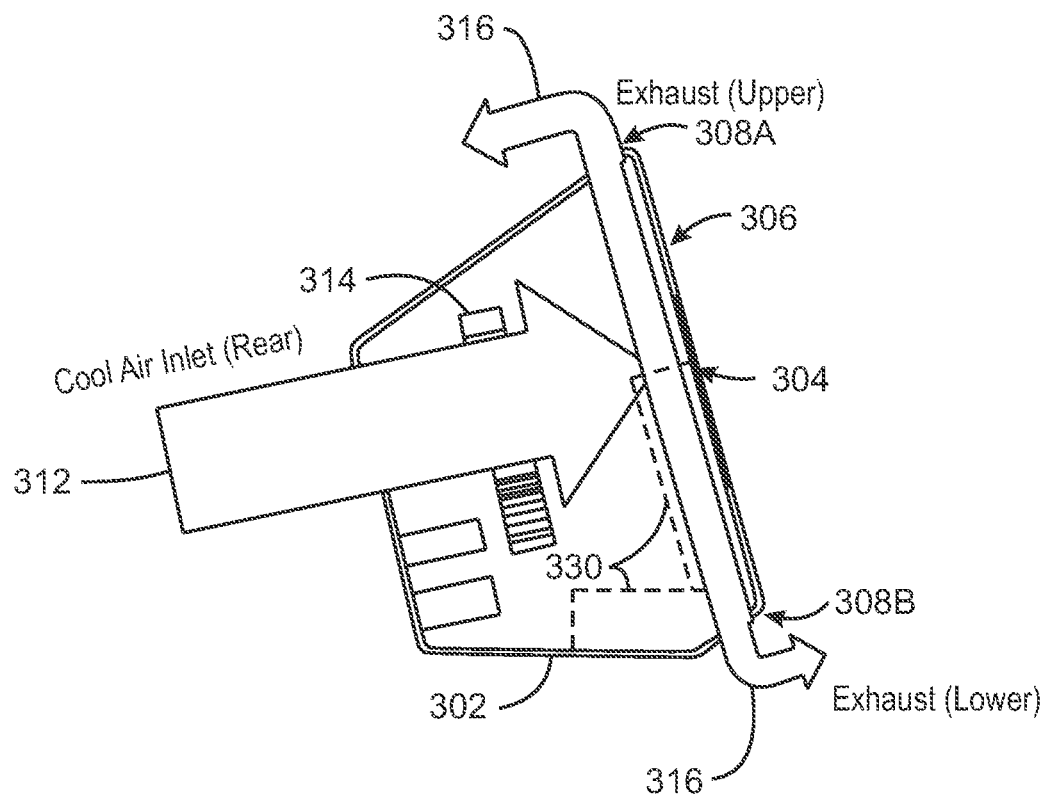
FIG. 3B is an illustration of a system including a cool air inlet, upper and lower exhaust vents, and a heat exchanger.

FIG. 3B is an illustration of a system including a cool air inlet, upper and lower exhaust vents, and a heat exchanger 330. Similar to FIG. 3A, the dock 302 includes a Peltier plate 304 at a front face 306 of the dock 302. The dock 302 also includes an upper exhaust vent 308A and a lower exhaust vent 308B. An intake air vent 310 may guide cool air from outside of the dock 302 to within the dock 302 as illustrated by the arrow 312. In embodiments, an air mover 314 is used to move air through the dock 302. A heat exchanger 330 may also be used to draw heat away from the Peltier plate 304. The air mover 314 may directed air through the dock 302, across both the Peltier plate 304 and the heat exchanger 330, and away from the dock via through the upper exhaust vent 308A and the lower exhaust vent 308B as illustrated by the arrow 316. In addition to the use of a fan to cool the thermoelectric device, a heat sink may be thermally coupled with the thermoelectric device for cooling purposes. While a heat exchanger is described, any heat exchanger may be used, such as a heat sink or heat pipe. The heat exchanger may include various plate fin heat exchangers arranged throughout the dock. In embodiments, the fins of the heat exchanger may be used to route air through the interior of the dock. Additionally, the dock may provide cooling through the use of one or more of any of the air mover, thermoelectric device, or heat exchangers. For example, the dock can enable cooling and performance enhancements even when the Peltier is not powered. In this manner, the dock can dynamically implement a cooling solution via one or more of any of the air mover, thermoelectric device, or heat exchangers.

Figure 4:
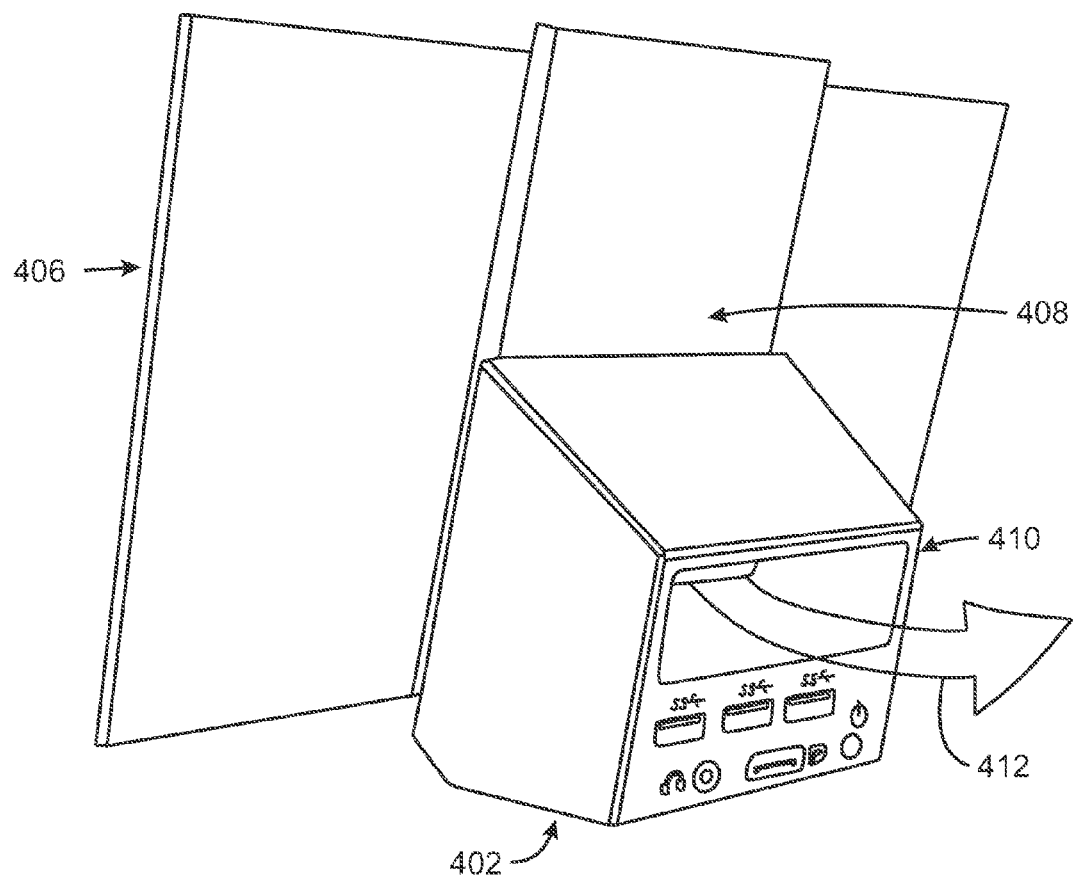
FIG. 4 is an illustration of a system including a dock with a single exhaust vent.

FIG. 4 is an illustration of a system 400 including a dock with a single exhaust vent. The system 400 includes a dock 402. In embodiments, the phablet 406 is physically coupled with the dock 402 via an alignment mechanism, such as a plurality of magnetic strips. In embodiments, the dock 402 includes a plurality of ports that are to couple a plurality of peripheral devices with the phablet 406 coupled with the dock 402.

In embodiments, the dock 402 enables several connection types. In embodiments, the dock 402 may include ports according to various standards, such as USB Type-C, USB2, USB3, PCIe, HDMI, DisplayPort, and so on. The USB Type-C standard can be used to enable connection types such as the USB2, USB3, PCIe, HDMI, DisplayPort, and the like. In embodiments, data transfer across the USB Type-C connector is according to any standard supported by the USB Type-C Specification. The USB2 is according to the Universal Serial Bus 2.0 Specification released April 2000. The USB3 is according to the Universal Serial Bus 3.1 Specification released on July, 2013. A High-Definition Multimedia Interface (HDMI) connection may be according to the HDMI Specification Ver. 2.0 released September 2013. DisplayPort (DP) may be according to the DisplayPort 1.3 released September 2014.

The dock 402 may include an intake air vent 408. In embodiments, an air mover will intake air through the intake air vent 408 to cool components of the dock 402. Heated air from within the dock 402 may be expelled via an exhaust vent 410 as illustrated by an arrow 412. Although a particular airflow is illustrated, the airflow through the adapter can be arranged in a number of configurations. In embodiments, channels within the dock are to guide the airflow through the dock. Additionally, channels located near the front plane of the dock can guide air from an airflow around the front side and back side of a computing device when physically docked. While the airflow is described as flowing across the front/back surfaces of the computing device, in embodiments a vent or opening on the computing device enables an airflow through the tablet.

The dock as described herein enables a cooling solution that can be scaled to enable dynamic cooling of the dock, in direct response to the cooling needs of a docked device. In this manner, the performance of a docked device can be increased several multiples higher than the natural, average capability of a mobile system. Put another way, the performance of a docked device is not limited by overheating concerns as is a device without additional cooling available. Further, the dock can dynamically communicates with the computing device. In embodiments, the dynamic communication enables the scaling of cooling requirements at the dock as necessary. A temperature control feedback loop may be used to scale the cooling requirements of the dock. Moreover, the power used by the computing device may also be scaled according to the cooling abilities of the dock, resulting in optimized power scaling.

Figure 5:
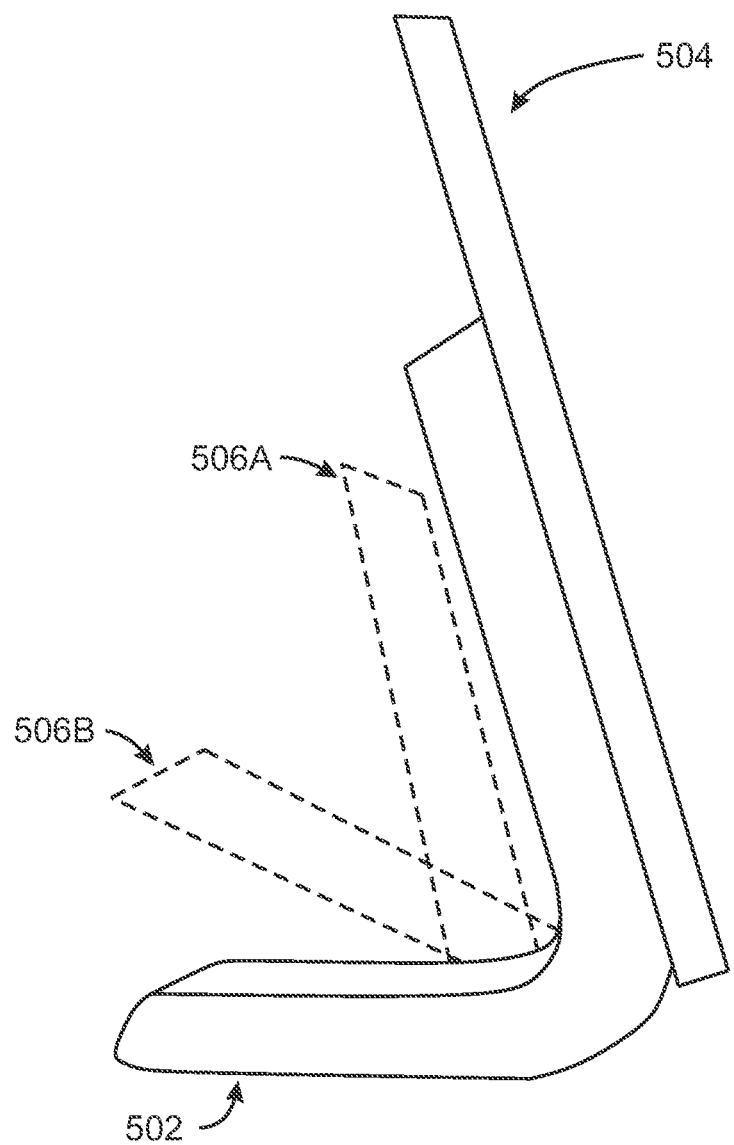
FIG. 5 is an illustration of a system including a foldable dock.

FIG. 5 is an illustration of a system 500 including a foldable dock. A dock 502 is illustrated and is coupled to a computing device 504. The computing device 504 may be cooled by a thermoelectric device, and may be coupled with the dock 502 via a magnetic strip for alignment. Additionally, air intake vents and exhaust vents may be positioned at various locations along the dock 502. In some cases, folding the dock may block or otherwise interfere with the air flow through air intake vents. As a result, the dock may include multiple air intake vents, such that air flow through the dock is not compromised when the dock in a folded position. The dock 502 may include an air mover to force cool air from outside of the dock 502, through the dock 502, and can expel the heated air from the dock 502.

In embodiments, the dock 502 is a travel, portable dock that can be folded at various positions. For example, the dock 502 may be folded at a position 506A or a second position 506B. Although two foldable positions are illustrated, the dock 502 may be foldable at any position.

In embodiments, airflow would be tuned within the dock via channels, baffles, and other appropriate air restrictors within the dock. In embodiments, when a computing device is docked, additional cooling is available from the dock. The additional cooling enables processing units of the computing device to increase performance, including but not limited to an increase in a processing core's clock upper speeds. This enables the computing device to be more adept when processing heavy workloads, such as gaming, streaming videos, or any other workload that causes a high amount of processing activity. Such a cooling scheme may be referred to as Adaptive Performance. Moreover, docking the enables an unlimited supply of power rather than the device running off of a finite supply of battery power. The access to unlimited power enables higher power modes that might not be available while running solely off of power from a battery.

Additionally, in embodiments, the physical or wireless docking enables the computing device to be communicatively coupled with another device via the dock. The dock may include a microcontroller that is to implement cooling according to an Adaptive Performance scheme. Via the physical or wireless docking, a user can further connect the computing device and/or or the dock to specific endpoints like USB devices, audio headsets, or DisplayPort displays. In embodiments, the computing device may be used to control the air mover via a physical or wireless connection. The computing device can control the volume of air and the speed of air output by the air mover. The air mover may be enumerated by the computing device as a USB device that is discovered after docking. In this manner, the tablet can monitor the state of power management of its system elements with the additional cooling functionality from the dock.

Figure 6:
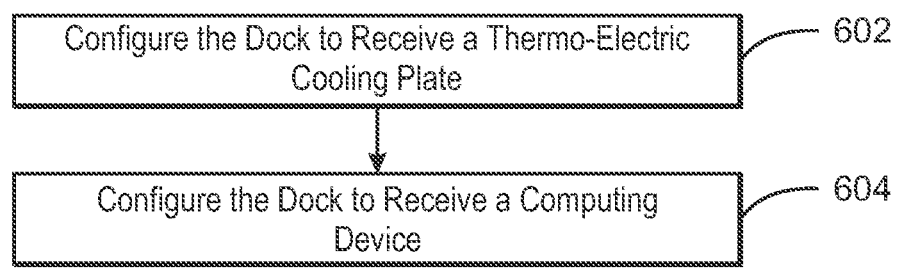
FIG. 6 is a process flow diagram illustrating a method for a dock with a cooling solution.

FIG. 6 is a process flow diagram illustrating a method 600 for a dock with a cooling solution. At block 602, a dock is configured to receive a thermoelectric cooling plate. In embodiments, an air mover is configured to move air surrounding components of the dock, including the thermoelectric cooling components, across the components and out of the dock. At block 604, the dock is configured to receive a computing device. In embodiments, the computing device may be aligned with the dock via an alignment mechanism. In embodiments, the alignment mechanism may be magnetic strips. In response to the computing device being docked, the dock can cool the computing device thermoelectrically.

Figure 7:
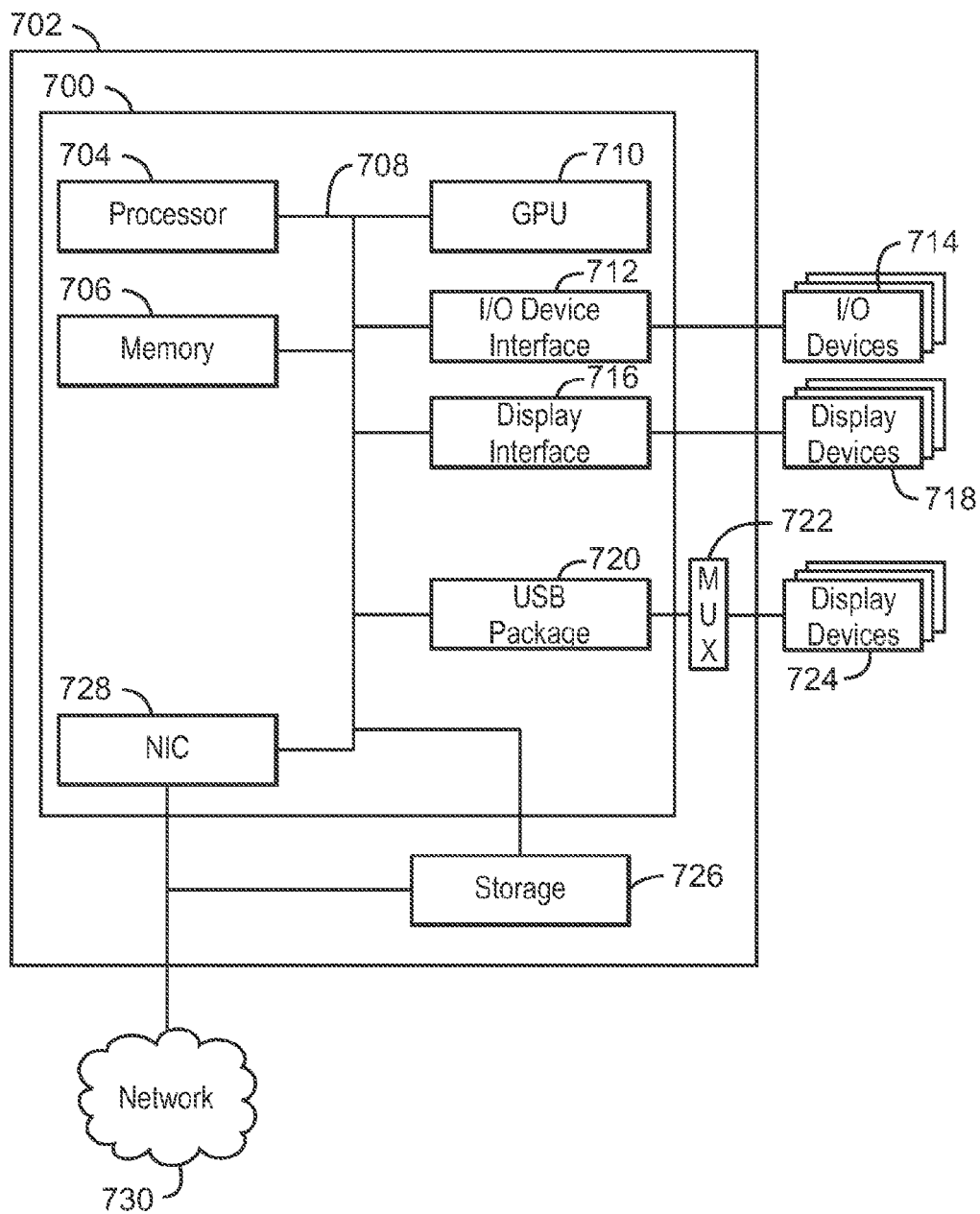
FIG. 7 is a block diagram of a system on chip (SoC) on a printed circuit board (PCB).

FIG. 7 is a block diagram of a system on chip (SoC) 700 on a printed circuit board (PCB) 702. The SoC 700 and PCB 702 may be components of, for example, a computing device such as a laptop computer, Ultrabook, tablet computer, computing device, or phablet, among others. The computing device may be coupled with a dock as described herein. The SoC 700 may include a central processing unit (CPU) 704 that is configured to execute stored instructions, as well as a memory device 706 that stores instructions that are executable by the CPU 704. The CPU may be coupled to the memory device 706 by a bus 708. Additionally, the CPU 704 can be a single core processor, a multi-core processor, a computing cluster, or any number of other configurations. Furthermore, the SoC 700 may include more than one CPU 704.

The SoC 700 may also include a graphics processing unit (GPU) 710. As shown, the CPU 704 may be coupled through the bus 708 to the GPU 710. The GPU 710 may be configured to perform any number of graphics functions and actions. For example, the GPU 710 may be configured to render or manipulate graphics images, graphics frames, videos, or the like, to be displayed to a user of the SoC 700. The memory device 706 can include random access memory (RAM), read only memory (ROM), flash memory, or any other suitable memory systems. For example, the memory device 706 may include dynamic random access memory (DRAM).

The CPU 704 may be connected through the bus 708 to an input/output (I/O) device interface 712 configured to connect the SoC 700 through various layers of the PCB 702, and components of the PCB 702 to one or more I/O devices 714. The I/O devices 714 may include, for example, a keyboard and a pointing device, wherein the pointing device may include a touchpad or a touchscreen, among others. The I/O devices 714 may be built-in components of a platform including the SoC 700, or may be devices that are externally connected to a platform including the SoC 700. In embodiments, the I/O devices 714 are coupled with a computing device including the SOC 700 via a dock.

The CPU 704 may also be linked through the bus 708 to a display interface 716 configured to connect the SoC 700 through various layers of the PCB 702, and components of the PCB 702 to one or more display devices 718. The display device(s) 718 may include a display screen that is a built-in component of a platform including the SoC 700. Examples of such a computing device include mobile computing devices, such as cell phones, tablets, 2-in-1 computers, notebook computers or the like. The display device 718 may also include a computer monitor, television, or projector, among others, that is externally connected to the SoC 700. In embodiments, the display devices 718 are coupled with a computing device including the SOC 700 via a dock.

The USB package 720 may include a transmitter and a receiver in order to transmit and receive USB data. The USB package 720 may also include components necessary to implement the USB Battery Charging Specification, USB On-the-Go Specification, and the USB Power Delivery Specification, and the USB Type-C Specification. The PCB 702 may also include components to implement the various USB Specifications. Data from the USB package 720 may be sent to a multiplexer (MUX) 722 and on to a plurality of USB devices 724. The MUX 722 may be used to select between various USB features enabled by the USB package 720. For example, the MUX 722 may be used to implement USB 2.0, USB 3.0, USB Battery Charging, USB Power Delivery, HDMI, DisplayPort, or PCIe, among others. In embodiments, the USB devices 714 are coupled with a computing device including the SOC 700 via a dock.

The SoC 700 may also be coupled with a storage device 726. The storage device may be a component located on the PCB 702. Additionally, the storage device 726 can be a physical memory such as a hard drive, an optical drive, a thumb drive, an array of drives, or any combinations thereof. The storage device 726 may also include remote storage drives. The SoC 700 may also include a network interface controller (NIC) 728 may be configured to connect the SoC 700 through the bus 708, various layers of the PCB 702, and components of the PCB 702 to a network 730. The network 730 may be a wide area network (WAN), local area network (LAN), or the Internet, among others.

It is to be understood that the block diagram of FIG. 7 is not intended to indicate that the SoC 700 is to include all of the components shown in FIG. 7. Rather, the SoC 700 can include fewer or additional components not illustrated in FIG. 7. Furthermore, the components may be coupled to one another according to any suitable system architecture, including the system architecture shown in FIG. 7 or any other suitable system architecture that uses a data bus to facilitate communications between components. For example, embodiments of the present techniques can also be implemented any suitable computing or computing device, including ultra-compact form factor devices, such as SoC and multi-chip modules.

Example 1 is a dock for a computing device. The computing device includes a thermoelectric device; an alignment mechanism; and an air mover, wherein the alignment mechanism is to align the computing device when docking the computing device, and the thermoelectric device is to cool the computing device when docked, and the air mover is to enable an airflow through the dock to cool the thermoelectric device when the computing device is docked.

Example 2 includes the computing device of example 1, including or excluding optional features. In this example, the thermoelectric device is a Peltier ceramic plate.

Example 3 includes the computing device of any one of examples 1 to 2, including or excluding optional features. In this example, the alignment mechanism includes at least one magnetic strip.

Example 4 includes the computing device of any one of examples 1 to 3, including or excluding optional features. In this example, the dock comprises at least partially hardware logic that is to control the thermoelectric device.

Example 5 includes the computing device of any one of examples 1 to 4, including or excluding optional features. In this example, the airflow through the dock is a multi-speed airflow and the speed of the airflow is scaled according to a use of the computing device.

Example 6 includes the computing device of any one of examples 1 to 5, including or excluding optional features. In this example, the thermoelectric device is to cool the computing device via a heat flux between the thermoelectric device and the computing device.

Example 7 includes the computing device of any one of examples 1 to 6, including or excluding optional features. In this example, the thermoelectric device is to cool the computing device through a Peltier effect between materials of the thermoelectric device and materials of the computing device.

Example 8 includes the computing device of any one of examples 1 to 7, including or excluding optional features. In this example, the dock further comprises a heat exchanger.

Example 9 includes the computing device of any one of examples 1 to 8, including or excluding optional features. In this example, the computing device includes a corresponding alignment mechanism to secure the computing device in physical contact with the thermoelectric device.

Example 10 includes the computing device of any one of examples 1 to 9, including or excluding optional features. In this example, the air mover is an electrokinetic system.

Example 11 is a system. The system includes a dock, wherein the dock comprises: a microcontroller; a thermoelectric device; an alignment mechanism; and an air mover, wherein the alignment mechanism is to align a docked computing device, and the microcontroller is to enable the thermoelectric device to cool the docked computing device, and the air mover is to enable an airflow through the dock to cool the thermoelectric device.

Example 12 includes the system of example 11, including or excluding optional features. In this example, the thermoelectric device is in physical contact with the docked computing device.

Example 13 includes the system of any one of examples 11 to 12, including or excluding optional features. In this example, the dock comprises air restrictors to guide the airflow across the computing device.

Example 14 includes the system of any one of examples 11 to 13, including or excluding optional features. In this example, the computing device comprises a vent and an air restrictor of the dock is configured to guide airflow through the vent of the computing device.

Example 15 includes the system of any one of examples 11 to 14, including or excluding optional features. In this example, the airflow through the dock is to control condensation within the dock.

Example 16 includes the system of any one of examples 11 to 15, including or excluding optional features. In this example, airflow through the dock is scaled according to the use of the docked computing device.

Example 17 includes the system of any one of examples 11 to 16, including or excluding optional features. In this example, the thermoelectric device is coupled with a thermally conductive material of the dock.

Example 18 includes the system of any one of examples 11 to 17, including or excluding optional features. In this example, the alignment feature is a plurality of magnetic strips.

Example 19 includes the system of any one of examples 11 to 18, including or excluding optional features. In this example, the dock comprises at least partially hardware logic that is to control the thermoelectric device and the air mover. Optionally, the computing device is communicatively coupled with the logic that is to control the thermoelectric device and the air mover.

Example 20 is a method for configuring a dock. The method includes configuring the dock to receive a thermoelectric cooling plate; and configuring the dock to receive a computing device.

Example 21 includes the method of example 20, including or excluding optional features. In this example, the dock comprises an alignment mechanism to receive the computing device.

Example 22 includes the method of any one of examples 20 to 21, including or excluding optional features. In this example, the thermoelectric cooling plate is a Peltier ceramic cooling plate.

Example 23 includes the method of any one of examples 20 to 22, including or excluding optional features. In this example, the thermoelectric cooling plate is physically coupled with a thermally conductive material of the dock.

Example 24 includes the method of any one of examples 20 to 23, including or excluding optional features. In this example, an air mover of the dock is to enable a multi-speed airflow and the speed of the airflow is scaled according to a use of the computing device. Optionally, in response to a computationally intensive use of the computing device, the multi-speed airflow increases.

Example 25 includes the method of any one of examples 20 to 24, including or excluding optional features. In this example, the method includes configuring a heat exchanger within the dock.

Example 26 includes the method of any one of examples 20 to 25, including or excluding optional features. In this example, the thermoelectric cooling plate is to cool the computing device according to a use profile of the computing device.

Example 27 includes the method of any one of examples 20 to 26, including or excluding optional features. In this example, the dock is configured to physically couple with the computing device to enable thermoelectric cooling of the computing device.

Example 28 includes the method of any one of examples 20 to 27, including or excluding optional features. In this example, the dock is configured to physically couple with the computing device in at least one of a landscape mode and a portrait mode of the computing device.

Example 29 is an apparatus. The apparatus includes a means for electrically cooling a computing device; an alignment mechanism; and an air mover, wherein the alignment mechanism is to align the computing device when docking the computing device, and the means to electrically cool the computing device is to cool the computing device when docked, and the air mover is to enable an airflow through the dock to cool the means to electrically cool the computing device when the computing device is docked.

Example 30 includes the apparatus of example 29, including or excluding optional features. In this example, the means to electrically cool the computing device is a Peltier ceramic plate.

Example 31 includes the apparatus of any one of examples 29 to 30, including or excluding optional features. In this example, the alignment mechanism includes at least one magnetic strip.

Example 32 includes the apparatus of any one of examples 29 to 31, including or excluding optional features. In this example, the dock comprises at least partially hardware logic that is to control the means to electrically cool the computing device.

Example 33 includes the apparatus of any one of examples 29 to 32, including or excluding optional features. In this example, the airflow through the dock is a multi-speed airflow and the speed of the airflow is scaled according to a use of the computing device.

Example 34 includes the apparatus of any one of examples 29 to 33, including or excluding optional features. In this example, the means to electrically cool the computing device is to cool the computing device via a heat flux between the means to electrically cool the computing device and the computing device.

Example 35 includes the apparatus of any one of examples 29 to 34, including or excluding optional features. In this example, the means to electrically cool the computing device is to cool the computing device through a Peltier effect between materials of the means to electrically cool the computing device and materials of the computing device.

Example 36 includes the apparatus of any one of examples 29 to 35, including or excluding optional features. In this example, the dock further comprises a heat exchanger.

Example 37 includes the apparatus of any one of examples 29 to 36, including or excluding optional features. In this example, the computing device includes a corresponding alignment mechanism to secure the computing device in physical contact with the means to electrically cool the computing device.

Example 38 includes the apparatus of any one of examples 29 to 37, including or excluding optional features. In this example, the air mover is an electrokinetic system.

In the foregoing description, numerous specific details have been set forth, such as examples of specific types of system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A dock for a computing device, comprising:
   a thermoelectric device positioned behind a thermally conductive front material;
   an alignment mechanism positioned behind the thermally conductive front material; and
   an air mover, wherein the alignment mechanism is to align the computing device when docking the computing device, and the thermoelectric device is to cool the computing device when docked, and the air mover is to enable an airflow through the dock to cool the thermoelectric device when the computing device is docked.

2. The dock of claim 1, wherein the thermoelectric device is a Peltier ceramic plate.

3. The dock of claim 1, wherein the alignment mechanism includes at least one magnetic strip.

4. The dock of claim 1, wherein the dock comprises at least partially hardware logic that is to control the thermoelectric device.

5. The dock of claim 1, wherein the airflow through the dock is a multi-speed airflow and the speed of the airflow is scaled according to a use of the computing device.

6. The dock of claim 1, wherein the thermoelectric device is to cool the computing device via a heat flux between the thermoelectric device and the computing device.

7. The dock of claim 1, wherein the thermoelectric device is to cool the computing device through a Peltier effect between materials of the thermoelectric device and materials of the computing device.

8. The dock of claim 1, wherein the dock further comprises a heat exchanger.

9. The dock of claim 1, wherein the computing device includes a corresponding alignment mechanism to secure the computing device in physical contact with the thermoelectric device.

10. The dock of claim 1, wherein the air mover is an electrokinetic system.

11. A system, comprising:
    a dock, wherein the dock comprises:
    a microcontroller;
    a thermoelectric device positioned behind a thermally conductive front material;
    an alignment mechanism positioned behind the thermally conductive front material; and
    an air mover, wherein the alignment mechanism is to align a docked computing device, and the microcontroller is to enable the thermoelectric device to cool the docked computing device, and the air mover is to enable an airflow through the dock to cool the thermoelectric device.

12. The system of claim 11, wherein the thermoelectric device is in physical contact with the docked computing device.

13. The system of claim 11, wherein the dock comprises air restrictors to guide the airflow across the computing device.

14. The system of claim 11, wherein the computing device comprises a vent and an air restrictor of the dock is configured to guide airflow through the vent of the computing device.

15. The system of claim 11, wherein the airflow through the dock is to control condensation within the dock.

16. The system of claim 11, wherein airflow through the dock is scaled according to the use of the docked computing device.

17. A method for configuring a dock, comprising:
configuring the dock to receive a thermoelectric cooling plate, wherein a thermoelectric device and an alignment mechanism is positioned behind a thermally conductive front material; and
configuring the dock to receive a computing device via the alignment mechanism.

18. The method of claim 17, wherein the thermoelectric cooling plate is a Peltier ceramic cooling plate.

19. The method of claim 17, wherein the thermoelectric cooling plate is physically coupled with a thermally conductive material of the dock.

20. The method of claim 17, wherein an air mover of the dock is to enable a multi-speed airflow and the speed of the airflow is scaled according to a use of the computing device.

21. The method of claim 17, comprising configuring a heat exchanger within the dock.

22. The method of claim 17, wherein the thermoelectric cooling plate is to cool the computing device according to a use profile of the computing device.

23. The method of claim 17, wherein the dock is configured to physically couple with the computing device to enable thermoelectric cooling of the computing device.

24. The method of claim 17, wherein the dock is configured to physically couple with the computing device in at least one of a landscape mode and a portrait mode of the computing device.

* * * * *